3,520,705
NON-VITREOUS CERAMIC WARE MADE FROM PSEUDOWOLLASTONITE
Fumiko Shido and Hiroshi Hagiwara, Tokyo, Japan, assignors to Onoda Cement Company, Limited, Onoda, Yamaguchi, Japan, a corporation of Japan
Filed May 2, 1967, Ser. No. 635,550
Claims priority, application Japan, May 10, 1966, 41/29,086
Int. Cl. C04b 33/00
U.S. Cl. 106—45          7 Claims

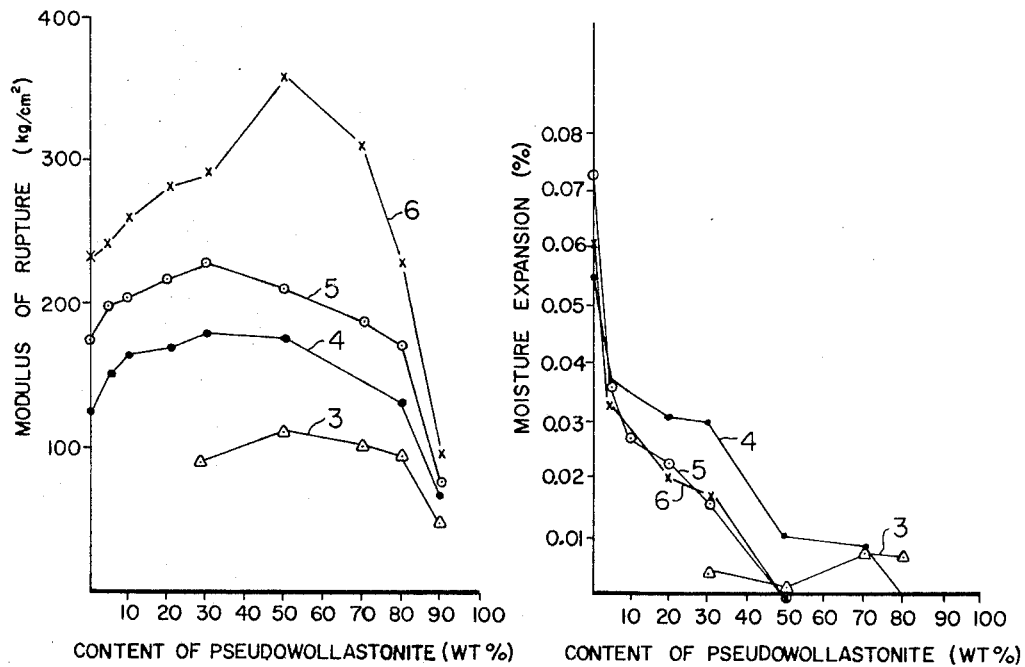
FIG. 4
FIG. 5
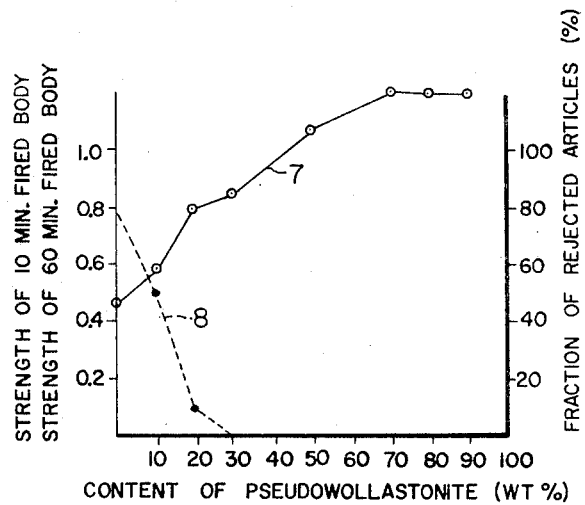
FIG. 6

ABSTRACT OF THE DISCLOSURE

Raw mixtures for ceramic bodies containing, as an essential and principal ingredient, pseudowollastonite produced by a sintering method and ceramic ware bodies produced from said mixtures by firing at temperatures below the vitrification temperature.

Figure 1:
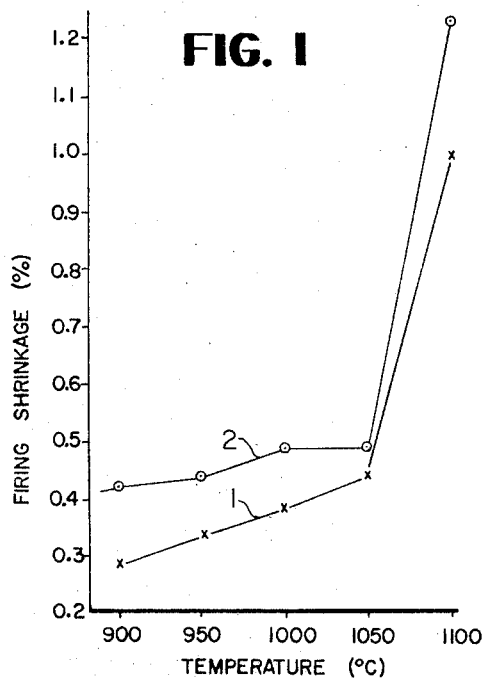

Said mixtures permit high green strength, good maturing with glaze, lowering of the firing temperature, and shortening of the firing time. The ceramic ware bodies obtained possess high strength, low size-variation and low moisture-expansion.

---

This invention relates to semi- or non-vitreous ceramic bodies, produced by the firing after shaping of mixtures containing, as an essential ingredient, pseudowollastonite, such as bodies of tiles, sanitary wares, table wares, ceramic ornaments, etc. of semi- or non-vitreous character.

An object of the present invention is to provide ceramic body compositions which can be readily released from a pressing mold after pressing and permit high green strength. Another object of the present invention is to provide green bodies which show low drying- and firing-shrinkage. A further object of the present invention is to provide ceramic bodies which show only a small variation of shrinkage relative to the variation of firing temperature. A still further object of the present invention is to provide ceramic body compositions which reduce firing temperature and shorten firing time. A still further object of the present invention is to provide ceramic bodies which are fired to the extent of water absorption of 5 to 20 percent by weight, possessing high strength and small moisture expansion. A still further object of the present invention is to provide ceramic bodies possessing excellent maturing property wtih glaze.

It has been known that when a natural wollastonite is used as a part of raw mixtures for producing ceramic bodies, there are advantages not only in the points that the drying speed of pressed green bodies is fast and the shrinkage during the step of drying and firing is small, but also in the points that fired ceramic bodies have only a small moisture expansion and high breaking strength. Some drawbacks, however, have been also noticed. That is, since natural wollastonite is grinded into prismatic or fibrous particles, due to its perfect cleavage in the direction of elongation of the crystal form, the conventional raw mixtures containing natural wollastonite as an essential ingredient does not have good filling property and moreover tend to allow a preferred orientation of wollastonite during pressing or slurry casting in shaping. Such a preferred orientation in a green body brought during shaping causes an oriented shrinkage during drying and firing, which is liable to generate cracks. Moreover, due to a small linear thermal expansion coefficient of the mineral ($\alpha=6-7\times10^{-6}$), some difficulties have been arisen in order to fit the thermal expansion of glaze to those of bodies containing wollastonite as an essential and main ingredient. Accordingly, natural wollastonite must be substituted with other raw material in order to produce ceramic bodies retaining the above-mentioned advantages, but free from such drawbacks.

Thus, we have investigated a method for producing ceramic bodies by using pseudowollastonite instead of natural wollastonite.

Pseudowollastonite, however, does not occur in nature. Thus, we have studied to produce the mineral synthetically through the following three methods:

(1) A method, in which monocalcium monosiliceous hydrated compound is made by the hydrothermal synthesis of raw mixtures at first, and then dehydrated by heating at temperatures higher than about 1,125° C. The pseudowollastonite made by the above-mentioned method will be hereinafter called as hydrothermally synthesized pseudowollastonite.

(2) A method, in which raw mixtures are fused at first, followed by the crystallization of the melt. The pseudowollastonite made by the above-mentioned method will be hereinafter called as fused pseudowollastonite.

(3) A method, in which raw mixtures are sintered without being fused. The pseudowollastonite made by the above-mentioned method will be hereinafter called as sintered pseudowollastonite.

The pseudowollastonite produced by the method (1), is of fine aggregates of granular shape. The body compositions containing the pseudowollastonite made by the method (1), have not only a difficulty in releasing from a mold after pressing, but also are susceptible to cracking or pronounced warping when the drying or the firing of shaped green bodies is carried out quickly. Very small green strength of the shaped green bodies makes edge trimming or cutting difficult and the high swelling of the green bodies by moisture brings about an additional disadvantage that direct glazing cannot be applied.

The pseudowollastonite made by the method (2) is so hard that its grinding is very difficult, and due to rather high content of glass phase of the pseudowollastonite, the firing shrinkage of bodies containing it is large. Accordingly, the pseudowollastonite produced by the foregoing method cannot be compounded in the composition of the present ceramic bodies.

However, the pseudowollastonite produced by the method (3) has no such drawbacks as in the case when the pseudowollastonites produced according to the foregoing two methods, are used. It has been found by the experiment that the pressed bodies obtained from the composition containing the pseudowollastonite made by the method (3) and the bodies obtained by firing thereof at a specified condition possess following advantages.

(a) Releasing from a mold after pressing is easy, drying-shrinkage is small, and strength is large and percentage of break is small in the processing of edge trimming or cutting.

(b) When firing is carried out in the temperature range where no vitrification of bodies occurs, the variation of firing shrinkage is small, shrinkage has no orientation and there is no crack formation.

(c) Since sintered pseudowollastonite possesses high chemical activity, it is possible not only to reduce the firing temperature and shorten the firing temperature for bisque firing, but also possible to reduce the maturing temperature and time for glaze firing.

(d) Since the coefficient of thermal expansion of sintered pseoudwollastonite is constant over a wide range of temperature, it is possible to carry out the fast firing of green bodies.

(e) Since the coefficient of linear thermal expansion of sintered pseudowollastonite is relatively large $$(\alpha=10-11\times10^{-6})$$

there is no difficulty in adjusting the thermal expansion of glaze to be used in bodies to a particularly small value and hence inexpensive glaze can be used.

As above-mentioned, the present invention is based upon the discovery of various advantages of using sintered pseudowollastonite. And the present invention consists of the method for producing semi- or non-vitreous ceramic wares, which is characterized by shaping, drying and firing of raw material body compositions incorporated with 5 to 80% by weight of sintered pseudowollastonite. The firing of bodies should be undertaken at a temperature not to cause vitrification and not to result in lower absorption than about 5 percent.

Raw materials for the composition used to produce the present ceramic bodies include, besides sintered pseudowollastonite, the same raw materials as those conventionally used, e.g. clay (talc, pyrophyllite, micas, kaolin, halloysite, and other clay minerals), feldspar, quartz, aplite, pegmatite, etc.

As sintered pseudowollastonites, those synthethized by various methods are used. As an example, a method proposed in U.S. Ser. No. 598,020, now Pat. No. 3,381,064, will be given herein below. This is a sintering method, which comprises heating and reacting, without fusion, a raw mixture composed of limy and silicic raw materials together with a small amount of sintering agents, if needed, such as compounds or glasses containing at least one of the following elements: Li, Na, K, Ba, Pb, Zn, Mg, Al, Ti, Zr, B and P.

In the practice of the present invention, the upper and lower limit of the firing temperature are determined according to the formulation which is to be varied, depending upon the various properties required in the ware product (e.g. necessary strength, water absorption, accuracy of dimension, moisture expansion or the like) and the firing is carried out in the range of temperature so determined.

The upper limit of firing temperature is generally lowest when about 50% by weight of sintered pseudowollastonite is used. With the increase or decrease of the amount used, the upper limit of temperature rises. For example, in the formulation indicated in the examples of experiment to be mentioned, the upper limit is about 1,100° C. in the case of 30–50% by weight use, 1,150° C. in the case of 70–80% by weight use and 1,200° C. in the case of 5–10% by weight use. When the firing is carried out at a temperature above the upper limit, glass phase is abundantly formed to cause vitrification and deformation, to give extremely large firing-shrinkage and hence the production of semi- or non-vitreous wares of good quality becomes impossible.

The lower limit of temperature for firing is determined according to the breaking strength and crazing resistance required for the products. The compound incorporated with about 30 to 50% by weight of sintered pseudowollastonite gives, by firing at 900° C., the ceramic bodies possessing a strength of 130–150 kg./cm.$^2$ and a moisture expansion of less than 0.02%, the character being comparable with those of the conventional commercial products.

Figure 2:
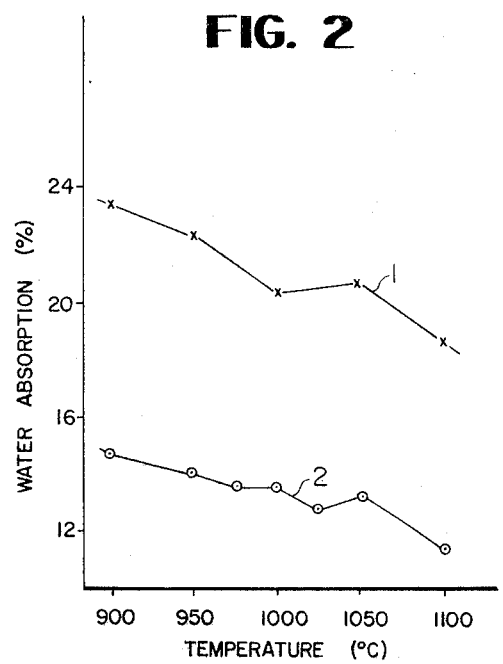
Figure 3:
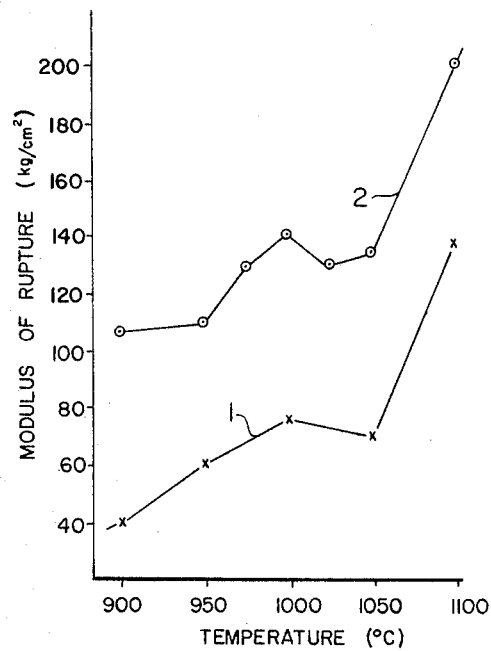

The present invention may be more fully understood from the following examples of experiments which are offered by way of illustration and not by way of limitation. Percents by weight are used throughout. Brief descriptions are given, at first, on the drawings concerning with these experiments. FIG. 1 shows the relationship between firing temperatures and firing shrinkages in bodies made from natural wollastonite-containing-composition and from sintered pseudowollastonite-containing-composition. FIG. 2 shows the relationship between firing temperatures and water absorptions in the two kinds of bodies. FIG. 3 shows the relationship between firing temperatures and moduli of rupture of these bodies. FIG. 4 shows the relationship between firing temperatures and moduli of rupture in the bodies obtained by changing the proposition of sintered pseudowollastonite in the body composition and by firing for one hour. FIG. 5 shows the relationship between firing temperatures and moisture expansion in the bodies obtained by changing the proportion of sintered pseudowollastonite. FIG. 6 shows the relationship under fast-firing condition (temperature 1,050° C.) between the fraction of the rejected articles and the proportion of sintered pseudowollastonite used in the body compositions.

EXPERIMENT 1 (GRINDING EXPERIMENT)

A natural wollastonite (Cabolite P–4, trade name of the product of Cabot Corp.), a fused wollastonite and a fused pseudowollastonite (both of them were synthesized by a fusion method), and a sintered pseudowollastonite were prepared to be of similar grain-size to each other. They were then compounded with Gaerome-clay, quartz, and Kibushi clay as a plastic clay in the proportion indicated in Table 1 and subjected to a wet- or dry-milling experiment.

TABLE 1

| | Wt. Percent |
|---|---|
| Wollastonite or pseudowollastonite | 55 |
| Gaerome clay | 20 |
| Kibushi clay | 15 |
| Quartz | 10 |

The time or the electric power required for milling these compounds as finely as to pass completely 200 mesh screen, was more than 2 times in the case of natural wollastonite compared with the time or the power in the case of sintered pseudowollastonite. The time or the power in the case of fused wollastonite or fused pseudowollastonite was more than 3 times. This fact indicates that sintered pseudowollastonite gives products of better quality, when it is ground at the same condition, because of its superior grinding property.

EXPERIMENT 2 (GREEN STRENGTH: MODULUS OF RUPTURE OF GREEN BODIES)

Gaerome clay, quartz and Kibushi clay were compounded with natural wollastonite (the same material as in Experiment 1), fused pseudowollastonite, hydrothermally-synthesized pseudowollastonite, or sintered pseudowollastonite in the proportions indicated in Table 1 and ground in the wet state into grain size of 200 mesh screen pass. The chemical compositions of these natural and synthetic minerals are shown in Table 2.

TABLE 2

| | $SiO_2$ (Percent) | $Al_2O_3$ (Percent) | $Fe_2O_3$ (Percent) | CaO (Percent) | MgO (Percent) | $Na_2O$ (Percent) | $K_2O$ (Percent) |
|---|---|---|---|---|---|---|---|
| Sintered pseudowollastonite | 51.3 | 2.0 | 0.2 | 45.4 | 0.8 | Trace | Trace. |
| Natural wollastonite | 50.7 | 0.5 | 0.6 | 47.4 | 0.2 | ...do... | Do. |
| Fused wollastonite | 51.3 | 2.0 | 0.2 | 45.4 | 0.8 | ...do... | Do. |
| Hydrothermally-synthesized pseudowollastonite | 51.0 | 1.0 | 0.2 | 47.1 | 0.4 | ...do... | Do. |

Filter pressed cakes of these compounds were reground after dried and 8% of water was sprayed. The moistened compounds were shaped into thin plates of 50 x 100 x 5 mm. by pressing under a pressure of 200 kg./cm.$^2$. Resultant shaped bodies were dried at 110° C. and subjected to the test for modulus of rupture, whereby the result shown in Table 3 was obtained.

TABLE 3.—MODULUS OF RUPTURE OF GREEN BODIES

|  | Kg./cm.$^2$ |
|---|---|
| Sintered pseudowollastonite | 28 |
| Natural wollastonite | 13 |
| Fused pseudowollastonite | 25 |
| Hydrothermally-synthesized pseudowollastonite | 18 |

It can be seen from the result of Table 3 that the green bodies containing sintered pseudowollastonite have greater strength than the green bodies containing other wollastonite or pseudowollastonite and that particularly the strength of the green bodies containing natural wollastonite is less than only a half of that of the green body containing sintered pseudowollastonite.

Further in the above-mentioned compounds, the green strength increases with increasing shaping pressure in the bodies incorporated with sintered pseudowollastonite. In the case of the compound incorporated with natural wollastonite, however, any notable increase of strength could not be expected and furthermore releasing from molds after pressing was not good, hence resulted in low shaping efficiency. In the case of hydrothermally-synthesized pseudowollastonite also releasing from molds after pressing was not good and the fast drying of shaped bodies resulted in crack or warpage formation. Furthermore, on account of their large moisture-swelling, direct glazing on the green bodies was difficult and therefore, the production of ceramic bodies of semi- or non-vitreous wares by way of fast single-firing was practically impossible on account of high percentage of rejected products with defect. The shaping property of fused-pseudowollastonite compounds was as good as that of sintered-pseudowollastonite compounds.

EXPERIMENT 3 (TESTS OF PHYSICAL PROPERTIES OF FIRED CERAMIC BODIES)

The dried green bodies obtained from a natural wollastonite and sintred pseudowollastonite in Experiment 2 were charged into an electric furnace, heated up to a specified temperature with a velocity of temperature elevation of 200° C./hr., then maintained at this temperature for one hour, and thereafter cooled to a room temperature in 30 minutes to produce fired bodies. The results of various physical tests of these bodies are indicated in FIGS. 1 to 3. In FIGS. 1 to 3, curves 1 and 2 show the results of test for bodies made from the composition with natural wollastonite and pseudowollastonite respectively.

The firing shrinkage of bodies containing natural wollastonite varies according to firing temperature, but that of bodies containing sintered pseudowollastonite is nearly constant in a wide range of firing temperature from 900° to 1,050° C. Thus, the composition with sintered pseudowollastonite permits to reduce the size-variation and to produce the product of high grade in the accuracy of dimension. FIG. 2 shows that water absorption is much smaller and hence the resistance to freezing and melting is larger in the case of sintered pseudowollastonite. FIG. 3 shows that modulus of rupture is also remarkably large in the case of ceramic bodies containing sintered pseudowollastonite than in the case of those containing natural wollastonite, and even at a relatively low firing temperature, sufficient strength is displayed in those containing a sintered pseudowollastonite. Thus, by the use of sintered pseudowollastonite, it is possible to improve the production process and products themselves of non-vitreous or porous ceramics.

The above-mentioned characteristics of the ceramic bodies with sintered pseudowollastonite are displayed not only in the formulation adopted in Experiment 1, but similarly also in the case where, in general, clay (talc, pyrophyllite, sericite, kaolins, halloysite or the like) feldspar, aplite, pegmatite etc. are used as other principal ingredients of the composition. When particularly pyrophyllite or talc or the both is used as the other principal ingredients of the body compositions in the foregoing experiments, it is possible to obtain products possessing superior physical properties even after such extreme fast firing as inserting dried green bodies abruptly from a room temperature to a furnace maintained at a specified temperature and taking them out of the furnace after 10 minutes firing.

The foregoing illustrations were given out of the experiments carried out with a constant amount of natural wollastonite or sintered pseudowollastonite as an ingredient of the body composition, but further illustrations will be given out of the experiments, in which the amount of sintered pseudowollastonite in the composition was varied.

EXPERIMENT 4

The sintered pseudowollastonite with the chemical composition shown in Table 4 was compounded with clay in the proportions indicated in Table 5 to get the raw mixture for ceramic tile bodies.

TABLE 4

|  | Wt. percent |
|---|---|
| $SiO_2$ | 50.2 |
| $Al_2O_3$ | 2.0 |
| $Fe_2O_3$ | 0.3 |
| $CaO$ | 45.5 |
| $MgO$ | 0.8 |
| $Na_2O$ | 0.4 |
| $K_2O$ | 0.6 |

TABLE 5
[Weight percent]

|  | PW-5 | PW-10 | PW-20 | PW-30 | PW-50 | PW-70 | PW-80 | PW-90 |
|---|---|---|---|---|---|---|---|---|
| Sintered pseudowollastonite | 5 | 10 | 20 | 30 | 50 | 70 | 80 | 90 |
| Pyrophyllite clay | 75 | 70 | 60 | 50 | 30 | 10 |  |  |
| Kibushi clay | 20 | 20 | 20 | 20 | 20 | 20 | 20 | 10 |

Besides, a similar experiment was carried out with a raw mixture of a representative conventional wall-tile body which does not contain sintered pseudowollastonite (referred to herein as PW-0) for comparison's sake. The formulation of the raw mixture and the chemical composition of the ceramic tile body obtained thereof are indicated in Table 6 and Table 7, respectively.

TABLE 6

|  | Wt. percent: dried wt. |
|---|---|
| Clay | 79 |
| Calcite | 11 |
| Aplite | 10 |

TABLE 7

|  | Wt. percent |
|---|---|
| $SiO_2$ | 71.0 |
| $Al_2O_3$ | 19.9 |
| $Fe_2O_3$ | 0.4 |
| $CaO$ | 7.1 |
| $MgO$ | 0.1 |
| $TiO_2$ | 0.1 |
| $Na_2O$ | 0.2 |
| $K_2O$ | 1.1 |

The grinding and shaping of raw mixtures were carried out as in Experiment 1, besides that a shaping pressure of 300 kg./cm.$^2$ was used. Thus several plates of dried green bodies having a dimension of 500 x 100 x 7 mm. were prepared in every formulation and used in the following firing test. Firing was carried out by heating the plates with an elevation velocity of 300° C./hr. until a specified temperature ranging from 800 to 1,200° C. was attained and maintaining at the specified temperature for one hour. The result is indicated in FIG. 4 where curves 3, 4, 5 and 6 show the moduli of rupture of fired bodies at the specified firing temperatures of 900° C., 1,000° C., 1,050° C. and 1,100° C., respectively. FIG. 4 shows clearly that with the increasing amount of sintered pseudowollastonite, breaking strength becomes higher and reaches a maximum value in the range of 30 to 50%. If the amount used is more than the range, strength drops gradually, but so long as it is less than 80%, breaking strengths of bodies are equal to or more than that of conventional commercial products.

The reason why ceramic bodies of high strength can be obtained thus by using sintered pseudowollastonite by the short period of firing at a low temperature, is due to the fact that sintered pseudowollastonite readily reacts with clay minerals and feldspars and a reaction zone is formed at the contact point of these raw material grains at a low temperature within a short period of time, which exerts binding force and increases the strength of ceramic bodies. Accordingly, greater the number of contact points of sintered pseudowollastonite with clay minerals etc. is, the greater the strength should be. This will explain that the strength reaches the highest value in the range of amount of 30 to 50% as in FIG. 4.

Moisture expansion is the most important character along with the dimensional accuracy and strength for the ceramic ware bodies. An experiment was also carried out, therefore, in this point. The result is shown in FIG. 5, where curves 3, 4, 5 and 6 indicate the relationship between the amount of pseudowollastonite used and the value of moisture expansion in the bodies fired at 900° C., 1,000° C., 1,050° C. and 1,100° C. respectively. The lower the moisture expansion is, the better the quality is, because glazed ceramics with bodies of greater moisture expansion is more susceptible to crazing. The result of FIG. 5 indicates that the use of sintered pseudowollastonite in an amount more than 5% reduces moisture expansion remarkably and the same result is observed also in the case of low temperature firing.

The PW–0 bodies obtained by firing at 800–900° C. formed cracks and were broken into small pieces only by immersing into water. In the case of PW–30–80 used in the present invention, however, did not show such phenomenon even in the bodies obtained by firing at 800–900° C., and a modulus of rupture of about 100 kg./cm.$^2$ and also a moisture expansion of less than 0.01% were indicated.

As indicated in the foregoing experiments, the amount of sintered pseudowollastonite used is preferable to be less than 80% from the point of the strength of fired ceramic bodies and to be more than 5% from the point of the moisture expansion. In other words, the amount of sintered pseudowollastonite is preferably used in the range of 5–80%, most preferably in the range of 30–70%.

Next, a firing experiment was carried out at such an extremely fast firing condition as 10 minute firing, in order to elucidate the suitability of the composition of the present invention containing sintered pseudowollastonite for the fast firing.

EXPERIMENT 5

In this experiment, the dried green bodies of Experiment 4 were stood upon a refractory slab and introduced from a room temperature abruptly into a furnace maintained at a specified temperature, and then taken out of the furnace after 10 minutes to be cooled. In order to measure the suitability of each composition for fast firing, existence or non-existence of warpage or crack was investigated in detail in 20 fired bodies for each composition, and also the modulus of rupture of 10 minutes fired body was measured and compared with that of 60 minutes fired one of the same composition. The results are shown in FIG. 6, where curve 7 indicates the ratios of strengths of 10 minutes fired bodies against those of 60 minute fired bodies in the firing temperature at 1,050° C., and curve 8 indicates the percentage of the rejected articles. The result of FIG. 6 shows that remarkable susceptibility of fast firing can be achieved by using more than 20%, preferably more than 30%, of sintered pseudowollastonite in reducing rejected articles due to fast firing. However, even in the case of less than 20%, fast firing property is increased with increasing amount of sintered pseudowollastonite used. 10 minute firing of the green bodies containing more than 20% of pseudowollasotnite permits to display more than 80% of the strength of the 60 minute fired bodies, and 10 minute firing is enough to produce a body with the strength comparable with or superior to that of the conventional ceramic bodies, and more-over with a moisture expansion lower than that of the conventional commercial products.

As is clear from the foregoing disclosure, the absolute values of modulus of rupture, moisture expansion, fast firing property, etc. varies, of course, according to the chemical composition of sintered pseudowollastonite itself, kinds or amounts of ingredients other than sintered pseudowollastonite to be compounded for ceramic bodies, production conditions of ceramic wares and so on. However, as mentioned above, in every case, strength suddenly drops, if the amount of sintered pseudowollastonite is more than 80%, and moisture expansion is exceedingly improved, if the amount of more than 5% is used. Furthermore, fast firing property shows clear tendency of improvement, when an amount in the range of 20 to 80% is used.

The following examples are given as illustration of the invention, the scope of the invention, however, not being limited to the specific examples. The production conditions and the chemical compositions of sintered pseudowollastonites used in Examples 1–5 are shown in Tables 8 and 9 respectively.

TABLE 8

| Symbol of clinker | Raw materials and their proportions in the compound (Wt. percent) | Firing condition | Principal mineral |
| --- | --- | --- | --- |
| A | Calcite, 80.0; silica rock, 32.1; clay, 16.3 | 1,400° C., 10 min | Pseudowollastonite. |
| B | Calcite, 80.0; silica rock, 34.9; clay, 2.2; aplite, 11.5 | 1,400° C., 10 min | Do. |
| C | Calcite, 80.0; silica rock, 42.8; borax, 5.7 | 1,370° C., 30 min | Do. |

TABLE 9
[Weight percent]

| | $SiO_2$ | $Al_2O_3$ | $Fe_2O_3$ | CaO+MgO | $Na_2O+K_2O$ | $B_2O_3$ |
| --- | --- | --- | --- | --- | --- | --- |
| A | 52.5 | 2.6 | 0.1 | 44.7 | 0.2 | |
| B | 51.9 | 2.4 | 0.2 | 44.6 | 1.1 | |
| C | 52.1 | 0.4 | 0.0 | 44.7 | 0.9 | 2.1 |

Example 1

Sintered pseudowollastonite A or B, pyrophyllite and Kibushi clay as a plastic component were admixed in the proportion indicated in Table 10 and subjected to wet-milling in a pot mill for 24 hours.

TABLE 10

Raw materials:                  Proportion (wt. percent)
    Pseudowollastonite A or B _____ 50
    Pyrophyllite (quartziferous) _____ 30
    Kibushi clay _____ 20

Subsequently, the slurry was filtered to obtain cakes, which were then dried at 60° C. and crushed into powder. The body compositions thus obtained were moistened with 8% of water and shaped by pressing under a pressure of 300 kg./cm.$^2$ to produce shaped green bodies having a size of 100 × 50 × 7 mm. After completion of drying at 110° C., the green bodies were charged from a room temperature abruptly into Kanthal wiring electric furnaces which had been maintained at 1,000° C., 1,030° C., or 1,060° C., and after 10 minutes, they are immediately taken out and left to cool. Resultant ceramic bodies were of excellent quality having no defect.

Further, some of the shaped green bodies dried at 110° C. were dried again sufficiently after glazing and subjected to the above-mentioned way of fast firing at 1,060° C. The maturing between glaze and bodies was exceedingly good and products of good quality were obtained. The examinations of various physical properties of the ceramic bodies and the glazed products are carried out and the results are shown in Table 11. For comparison's sake, the ceramic composition containing a commercial natural wollastonite instead of pseudowollastonite was prepared similarly and examined simultaneously by the same method. The results are also shown in Table 11.

Then the mixture was moistened with 8% of water, shaped by pressing under a pressure of 150 kg./cm.$^2$ and dried. Shaped green bodies were charged to an electric furnace, the temperature of which was elevated with a velocity of 200° C./hr., maintained there at 1,000°–1,050° C. or 1,080° C. for one hour and taken out of the furnace. The properties of resultant products were excellent as shown in Table 15.

TABLE 15

| Firing temperature (° C.) | Firing shrinkage (percent) | Water absorption (percent) | Modulus of rupture (kg./cm.$^2$) | Crazing resistance test by an autoclave |
|---|---|---|---|---|
| 1,000–1,050 | 0.35–0.40 | 17.0–16.5 | 150 | Nice. |
| 1,080 | 0.72 | 5 | 450 | Do. |

Example 4

The sintered pseudowollastonite clinkers, the character of which are shown in Tables 8 and 9B, were ground, ad-

TABLE 11

| Pseudowollastonite used— | Modulus of rupture of dried green bodies (kg./cm.$^2$) | Firing shrinkage (percent) | | | Modulus of rupture (kg./cm.$^2$) | | | Water absorption (percent) | | | Moisture expansion,$^1$ 1,000°–1,060° C. | Crazing test of glazed product |
|---|---|---|---|---|---|---|---|---|---|---|---|---|
| | | 1,000° C. | 1,030° C. | 1,060° C. | 1,000° C. | 1,030° C. | 1,060° C. | 1,000° C. | 1,030° C. | 1,060° C. | | |
| A | 21 | 0.18 | 0.21 | 0.20 | 220 | 240 | 260 | 15.8 | 15.5 | 15.5 | 0.002 | No crazing. |
| B | 21 | 0.55 | 0.58 | 0.62 | 270 | 310 | 380 | 15.8 | 15.5 | 15.5 | 0.002 | Do. |
| Cabolite | 12 | 0.24 | 0.30 | 0.34 | 210 | 250 | 290 | 17.8 | 17.5 | 17.5 | 0.002 | |

$^1$ The specimens were subjected to an autoclave test at 10.5 kg./cm.$^2$ (186° C.) for one hour.
$^2$ The specimens mounted on the surface of concrete were subjected to the autoclave test at 180° C. for one hour.
NOTE.—Commercial tiles supplied from several companies were simultaneously subjected to the same autoclave test but crazing appeared in all of them.

Edge trimming operations were carried out on the dried green bodies with a grinder. The green bodies containing pseudowollastonite A or B underwent the operation without any trouble, but those containing Cabolite could not be successfully trimmed and the trimmed surface was not smooth and some of the green bodies were broken.

Example 2

The sintered pseudowollastonite clinkers such as those shown in the above-mentioned Tables 8 and 9B were ground, admixed with other ingredients in the proportion shown in Table 12 and subjected to wet-milling.

TABLE 12

| | Wt. percent |
|---|---|
| Pseudowollastonite | 40 |
| Talc | 35 |
| Gaerome clay | 10 |
| Kibushi clay | 15 |

Through the same treatment as in Example 1, dried shaped green bodies having a size of 100 x 50 x 7 mm. were obtained. They were charged to an electric furnace maintained at 1,060° C., and fired there for 20 minutes and taken out of the furnace. Resultant products had extremely superior properties as indicated in Table 13.

TABLE 13

| | |
|---|---|
| Firing shrinkage (percent) | 0.61 |
| Water absorption (percent) | 15.0 |
| Modulus of rupture (kg./cm.$^2$) | 200 |
| Crazing resistance test by an autoclave | No crazing |

The compounds obtained by mixing the sintered pseudowollastonites, the character of which are indicated in Tables 8 and 9, in the proportion shown in Table 14 were finely ground.

TABLE 14

| | Wt. percent |
|---|---|
| Pseudowollastonite | 50 |
| Gaerome clay | 20 |
| Kibushi clay | 20 |
| Silica rock | 10 | mixed with other raw ingredients in the proportion shown in Table 16 and subjected to wet milling.

TABLE 16

| | Wt. percent |
|---|---|
| Sintered pseudowollastonite | 10 |
| Aplite | 30 |
| Pyrophyllite | 40 |
| Kibushi clay | 20 |

Thereafter through the same treatment as in Example 1, dried shaped green bodies having a size of 100 x 50 x 7 mm. were obtained. They were charged to an electric furnace, and the temperature of the furnace was elevated from a room temperature with a velocity of 300° C./hr., and maintained at 1,120° C. for one hour. Then they were transferred to a muffle furnace to keep out of wind and cooled there down to a room temperature in 30 minutes. Resultant products had extremely superior properties as indicated in Table 17.

TABLE 17

| | |
|---|---|
| Firing shrinkage (percent) | 1.2 |
| Water absorption (percent) | 7 |
| Modulus of rupture (kg./cm.$^2$) | 550 |
| Crazing resistance test by an autoclave | Excellent |

What is claimed is:

1. An unfired green body consisting essentially of a raw mixture of 5 to 80 weight percent of sintered pseudowollastonite and the remaining part conventional raw materials selected from the group consisting of pyrophyllite, kaolin, halloysite, sericite, feldspars and quartz.

2. The unfired green body of claim 1 wherein the raw mixture contains 20 to 70 percent by weight of pseudowollastonite.

3. The unfired green body of claim 1 wherein the raw mixture contains 70 to 80 percent by weight of pseudowollastonite.

4. The unfired green body of claim 1 wherein the raw mixture contains 5 to 20 percent by weight of pseudowollastonite.

5. A method of producing fired, non-vitreous ceramic articles comprising shaping, drying and firing at a temperature below the vitrification temperature a raw mixture comprising 5 to 80 weight percent of sintered pseudowollastonite and the remaining part conventional raw materials selected from the group consisting of pyrophyllite, koalin, halloysite, sericite, feldspars and quartz.

6. The method of claim 5 wherein said firing is conducted at a temperature of from about 900° C. to 1200° C.

7. The product of the process of claim 5.

References Cited

UNITED STATES PATENTS 2,159,349   5/1939   Bennett _____ 106—45

OTHER REFERENCES

Jackson, W. M., Low-Loss Electrical Bodies from Wollastonite, in Amer. Cer. Soc. Bulletin, 32 (1953), pp. 306–308.

Hurlbut, C. S., Dana's Manual of Mineralogy, New York (John Wiley & Sons Publ.), 1941, p. 326.

HELEN M. McCARTHY, Primary Examiner

W. R. SATTERFIELD, Assistant Examiner

U.S. Cl. X.R.

106—46, 63, 69